(12) United States Patent
Zhou (10) Patent No.: US 8,879,505 B2
(45) Date of Patent: Nov. 4, 2014

(54) HANDOFF METHOD AND SYSTEM FOR MOBILE TERMINAL

(75) Inventor: Wei Zhou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 159 days.

(21) Appl. No.: 13/505,766

(22) PCT Filed: Apr. 8, 2010

(86) PCT No.: PCT/CN2010/071642
§ 371 (c)(1),
(2), (4) Date: Jun. 19, 2012

(87) PCT Pub. No.: WO2010/145273
PCT Pub. Date: Dec. 23, 2010

(65) Prior Publication Data
US 2012/0250657 A1   Oct. 4, 2012

(30) Foreign Application Priority Data
Nov. 3, 2009   (CN) .......................... 2009 1 0110473

(51) Int. Cl.
| H04W 4/00 | (2009.01) |
|---|---|
| H04W 36/00 | (2009.01) |
| H04W 12/06 | (2009.01) |
| H04W 12/04 | (2009.01) |
| H04W 36/08 | (2009.01) |

(52) U.S. Cl.
CPC .............. *H04W 12/06* (2013.01); *H04W 12/04* (2013.01); *H04W 36/0038* (2013.01); *H04W 36/08* (2013.01)
USPC .......................................... 370/331; 455/439

(58) Field of Classification Search
None
See application file for complete search history.

(56) References Cited

U.S. PATENT DOCUMENTS

| 6,473,413 | B1 * | 10/2002 | Chiou et al. ................... 370/331 |
|---|---|---|---|
| 7,146,636 | B2 * | 12/2006 | Crosbie ............................. 726/7 |
| 7,158,777 | B2 | 1/2007 | Lee et al. |
| 7,275,157 | B2 | 9/2007 | Winget |
| 2004/0014422 | A1 * | 1/2004 | Kallio ........................... 455/41.1 |
| 2004/0203783 | A1 | 10/2004 | Wu et al. |
| 2004/0240412 | A1 * | 12/2004 | Winget ......................... 370/331 |
| 2007/0291681 | A1 * | 12/2007 | Jokela et al. ................... 370/328 |
| 2009/0028120 | A1 * | 1/2009 | Lee ................................ 370/338 |
| 2009/0303974 | A1 * | 12/2009 | Chi et al. ....................... 370/338 |

FOREIGN PATENT DOCUMENTS

CN          1602109 A       3/2005

OTHER PUBLICATIONS

PCT International Search Report for PCT/CN2010/071642 mailed Aug. 19, 2010 (4 pages).

* cited by examiner

*Primary Examiner* — Ashley Shivers
(74) *Attorney, Agent, or Firm* — Sutherland Asbill & Brennan LLP (57) ABSTRACT

Disclosed in the present invention are a handover method and system for a mobile terminal (MT) based on a wireless local area network. The method includes: sending a data frame to a second AP when an MT needs to hand over from a cell covered by a first AP service to a cell covered by a second AP service, with the data frame including an associated number between the MT and the first AP and an MAC access of the first AP; and the second AP looking up locally stored mobile terminal certification and association information about the cell covered by the first AP service and rapidly determining whether to allow the access of the MT according to the stored information.

15 Claims, 4 Drawing Sheets

| Associated number between MT and AP | Associated AP information | MAC address of associated AP | MT certification information | Valid time of MT and AP certification and association | Valid time of the associated AP caching the frame |
|---|---|---|---|---|---|
| MT1 | | | | | |
| MT2 | | | | | |
| ⋮ | | | | | |
| MTn | | | | | |

HANDOFF METHOD AND SYSTEM FOR MOBILE TERMINAL

CROSS REFERENCE TO RELATED APPLICATIONS

This application claims the priority benefit of PCT/CN2010/071642 filed on Apr. 8, 2010 and Chinese Application No. 200910110473.6 filed on Nov. 3, 2009. The contents of these applications are hereby incorporated by reference in their entirety.

TECHNICAL FIELD

The present invention relates to the communication field, and particularly, to a handover method and system for a mobile terminal based on a wireless local area network.

BACKGROUND OF THE RELATED ART

With the rapid development of the network and the popularization of laptops, the requirements on mobile office is becoming higher and higher. The conventional wired local area network is limited by the layout, and the wires are easy to be damaged, bringing inconvenience to maintenance and capacity expansion, and also the relocation and movement of various nodes in the network are quite cumbersome. Therefore, a wireless local area network which is high efficient and convenient and flexible in networking emerges because of demand.

The wireless local area network (WLAN) is a product of the combination of computer networks and wireless communication technologies. It takes a wireless multi-access channel as the transmission media, carries out data interaction using electromagnetic waves, and achieves the function of the conventional wired local area networks. Currently, the American Institute of Electrical and Electronics Engineers (IEEE) 802.11 has become the standard of WLAN and obtains a great deal of application and support. WLAN at least has to include a wireless access point (AP), and AP provides service within a limited physical area (abbreviated as cell in the following); if a large area of service coverage is to be achieved, a plurality of APs need to be installed. Different APs provide service for different cells, and a plurality of APs achieve a large area of service coverage all together. In the WLAN, when the mobile terminal (MT) moves from a cell to another cell, i.e. "handover" occurs to MT, there will be the problem of how to keep continuous data transmission. In order to solve this problem, IEEE802.11 working committee established an IEEE802.11f research group in March 2000, which is responsible for the development and implementation of the Inter Access Point Protocol (IAPP).

Figure 1:
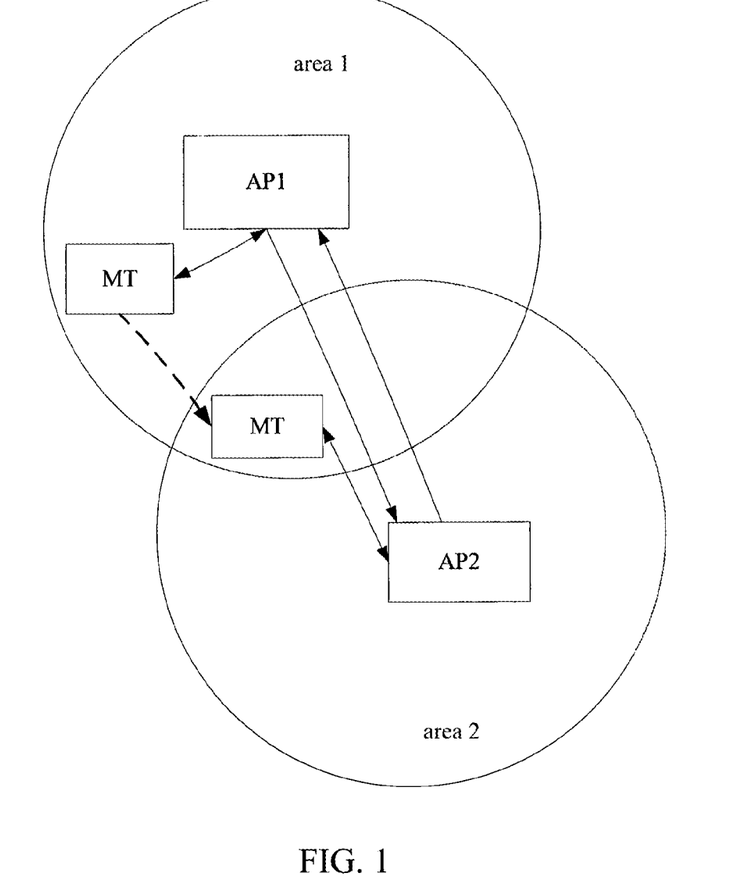
FIG. 1 is a schematic diagram of an MT handover scenario in the related art.

As shown in FIG. 1, FIG. 1 is a schematic diagram of an MT handover scenario in the related art. In the figure, there are two APs: AP1 and AP2; two cells: area 1 and area 2; and one MT. In the related art, the handover procedure of the MT mainly includes: when the MT moves from the cell (area1) covered by AP1 service to the cell (area2) covered by AP2 service, the MT sends a reconnection request to AP2, which carries the media access control (MAC) address of AP1 to which the MT is previously connected; AP2 returns a reconnection acknowledgement to the MT, and then sends handover information to AP1; AP1 sends information about the MT to AP2 according to the handover information and queries the maintenance time of the connection with the MT, if the connection maintenance time is less than the handover suppression time, then AP1 sends a connection relief frame to the MT in the cell covered by its service and deletes the MT from the local service list, if the connection maintenance time is greater than the handover suppression time, then AP1 does not send the connection relief frame but only deletes the MT from the local service list; AP2 associates with the MT according to the information about the MT and allocates a key to the MT, which is shared in an extended service set (ESS); and the MT carries out data transmission with AP2 using this key.

The problems existing in the above solution of the related art at least include: when the MT hands over from a cell covered by AP1 service to a cell covered by AP2 service, AP2 has to re-certificate the MT and has to acquire the information about the MT from AP1 actively, which causes that the entire handover procedure needs longer time and consumes additional radio resources, greatly reducing the communication efficiency of WLAN; and the key allocated by AP2 to the MT is shared within the same ESS, significantly reducing communication security.

SUMMARY OF THE INVENTION

The main object of the present invention is to propose a method and system which can rapidly achieve mobile terminal handover with respect to the defects in the related art, which is advantageous for avoiding the influence on the quality of service by temporary service interruption caused by a handover.

A handover method for a mobile terminal comprises:
sending a data frame to a second AP when a mobile terminal (MT) needs to hand over from a cell covered by a first AP service to a cell covered by the second AP service, with the data frame including an associated number between the MT and the first AP and an MAC access of the first AP;

after having received the data frame, the second AP comparing the associated number between the MT and the first AP and the media access control (MAC) address of the first AP in the data frame with the corresponding contents in the mobile terminal certification and association information stored by the second AP, when the comparison result presents to be consistent, then the second AP encrypting a new key using the shared key of the first AP and sending the information obtained by the encryption to the MT, and the MT removing the association with the first AP and obtains a number associated with the second AP;

the MT adding an association with the second AP according to the obtained number associated with and the second AP, decrypting the obtained new key, and carrying out data transmission between itself and the second AP using the new key.

When comparing the mobile terminal certification and association information, the method further comprises:
judging whether the MT and the first AP certification and association information is within the valid range of the MT and the first AP certificate certification and association, if yes, then the second AP sending the new key encrypted by using the locally stored shared key of the first AP to the MT.

The method further comprises:
the second AP scanning a local mobile terminal certification and association information list regularly and deleting all the certification and association information related to the MT which exceeds the valid time range of certification and association.

The method further comprises:
the second AP storing the mobile terminal certification and association information about a cell which overlaps with a cell covered by the second AP service, with the information including the mobile terminal certification and association information about the cell covered by the service of the first AP.

The method further comprises:

the second AP storing a shared key of an AP of a cell which overlaps with a cell covered by the second AP service, with the key including the shared key of the first AP.

The new key is a shared key of the second AP, or the new key is a key generated after the negotiation between the MT and the second AP.

The method further comprises:

the second AP sending the MT and the second AP certification and association information to a AP of a cell which overlaps with a cell covered by the second AP service;

after the APs of the cells which overlap with cells covered by the second AP service and do not overlap with cells covered by the first AP service have received the MT and the second AP certification and association information, they looking up the locally stored mobile terminal certification and association information, determining that the MT and the second AP certification and association information is not previously stored, then storing the MT and the second AP certification and association information; and after the APs of the cells which overlap with cells covered by the first AP service and cells covered by second AP service and the first AP have received the MT and the second AP certification and association information, they looking up the locally stored mobile terminal certification and association information, determining that the MT and the first AP certification and association information is previously stored, then deleting the MT and the first AP certification and association information and storing the MT and the second AP certification and association information.

The method further comprises:

after the first AP has stored the MT and the second AP certification and association information, the first AP sending the MT and the first AP association relief information to the APs of the cells which overlap with cells covered the first AP service except the second AP;

after the APs of cells which overlap with cells covered by the first AP service and cells covered by second AP service have received the MT and the first AP association relief information, they looking up the locally stored mobile terminal certification and association information, determining that the MT and the second AP certification and association information is previously stored, then discarding the MT and the first AP association relief information; and after the APs of the cells which overlap with cells covered by the first AP service and do not overlap with cells covered by second AP service have received the MT and the first AP association relief information, they looking up the locally stored mobile terminal certification and association information respectively, determining that the MT and the first AP certification and association information is previously stored, then deleting the MT and the first AP certification and association information.

The MT and the first AP certification and association information comprises: an associated number between the MT and the first AP and the MAC address of the first AP.

The MT and the first AP certification and association information further comprises: valid time of MT and the first AP certification and association, the first AP information, MT certification information and valid time of the first AP cache frame.

The method further comprises that: the first AP is preconfigured with the valid time of for the first AP caching the frame related to the MT, MT and the first AP association relief triggers the timing of the valid time for caching the frame by the first AP; and if there is a data frame to be sent to the MT within the valid time for caching the frame, the first AP caches all the data frames to be sent to the MT for the MT before receiving the MT and the second AP certification and association information.

The method further comprises that: if the associated number between the MT and the first AP and the MAC address of the first AP do not exist in the mobile terminal certification and association information about the cell covered by the first AP service, or if the associated number between the MT and the first AP and the MAC address of the first AP are inconsistent with the information in the mobile terminal certification and association information about the cell covered by the first AP service, or if the associated number between the MT and the first AP and the MAC address of the first AP exist in the mobile terminal certification and association information about the cell covered by the first AP service, however the MT and the first AP certification and association information already exceeds the valid time range of the MT and the first AP certification and association, then the handover process ends.

The method further comprises that: after the second AP has received the data frame, the second AP looks up a locally stored access control list, if the information about MT does not exist in the access control list, then it loops up a mobile terminal certification and association information list of the first cell.

A handover system for a mobile terminal comprises: a handover request unit, a handover judgment unit, a user side handover execution unit, and a network side handover execution unit, wherein the handover request unit is used for sending a data frame for requesting handover when an MT to which it belongs needs to hand over from a first AP to a second AP, with the data frame including an associated number between the MT and the first AP and the MAC address of the first AP;

the handover judgment unit is used for comparing the associated number between the MT and the first AP and the MAC address of the first AP in the data frame from the handover request unit with the corresponding contents in the mobile terminal certification and association information stored by the second AP, when the comparison result presents to be consistent, then notifying the handover execution unit, encrypting a new key using the shared key of the first AP, and sending the information obtained from encryption to the user side handover execution unit; and the user side handover execution unit is used for completing the handover with the network side handover execution unit by using the new key.

The system further comprises a timing judgment unit for judging whether the MT and the first AP certification and association information exists in the valid time range of the MT and the first AP certification and association, and notifying the handover judgment unit to encrypt the new key when the judgment result is yes.

The system further comprises a first AP side handover information synchronization unit and a second AP side handover information synchronization unit, wherein the first AP side handover information synchronization unit is used for sending MT and the first AP association relief information to an AP in a cell which overlaps with a cell covered by the first AP service except the second AP; and the second AP side handover information synchronization unit is used for sending MT and the second AP certification and association information to an AP in a cell which overlaps with a cell covered by the second AP service.

In the technical solution described by the above embodiments of the present invention, since each AP stores the mobile terminal certification and association information about the cells which overlap with the cells covered by its service, when the MT needs to hand over from a cell to another cell, the AP serving another cell can rapidly determine whether or not to allow the MT to access according to the stored information, thus overcoming the problem that the wireless local area network communication needs to be re-certificated during a handover, significantly improving the communication efficiency, and avoiding the influence on the quality of service by temporary service interruption caused by handover; and, since each AP stores the shared key of the APs of the cells which overlap with the cells covered by its service, the data transmitted between the MT and different APs have different keys or employ a key negotiated by the MT and the AP, which can ensure that the data transmitted between each MT and AP have different keys, apparently avoiding the use of the same key by one ESS and effectively improving the communication security.

PREFERRED EMBODIMENTS OF THE PRESENT INVENTION

Figure 2:
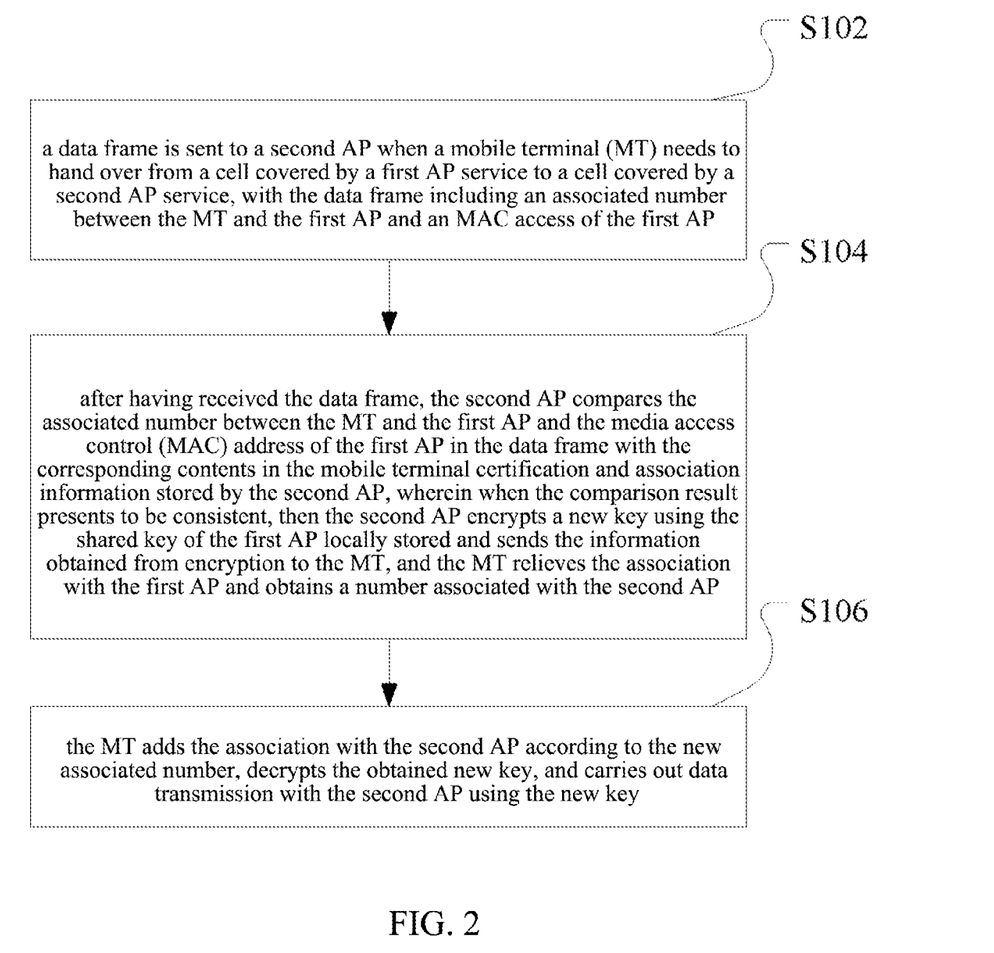
FIG. 2 is a flowchart of an MT handover method according to an embodiment of the present invention.

The embodiments of the present invention provide a handover method for a mobile terminal, and as shown in FIG. 2, FIG. 2 is a flowchart of an MT handover method according to an embodiment of the present invention, this method includes:

S102: a data frame is sent to a second AP when a mobile terminal (MT) needs to hand over from a cell covered by a first AP service to a cell covered by a second AP service, with the data frame including an associated number between the MT and the first AP and an MAC access of the first AP;

S104: after having received the data frame, the second AP compares the associated number between the MT and the first AP and the media access control (MAC) address of the first AP in the data frame with the corresponding contents in the mobile terminal certification and association information stored by the second AP, wherein when the comparison result presents to be consistent, then the second AP encrypts a new key using the shared key of the first AP locally stored and sends the information obtained from encryption to the MT, and the MT relieves the association with the first AP and obtains a number associated with the second AP.

In this case, when comparing mobile terminal certification and association information, it further comprises: judging whether the MT and the first AP certification and association information is within the valid time range of the MT and the first AP certification and association, if yes, then the second AP sends the new key encrypted by using the locally stored shared key of the first AP to the MT.

Thus, the MT completes the handover from the first cell to the second cell. In the technical solution described by the above embodiments, the method further comprises:

the second AP scans a local mobile terminal certification and association information list regularly and deletes all the certification and association information related to the MT which exceeds the valid time range of certification and association.

In the technical solution described by the above embodiments, the method further comprises:

the second AP pre-stores the mobile terminal certification and association information about a cell which overlaps with a cell covered by the second AP service, the information includes the mobile terminal certification and association information about a cell which overlaps with a cell covered by the first AP service, and also pre-stores the shared key of an AP of a cell which overlaps with a cell covered by the second AP service, the key includes the shared key of the first AP. The new key obtained by the decryption of the MT can be the shared key of the second AP and can also be a key generated after the negotiation between the MT and the second AP.

The MT and the first AP certification and association information in the technical solution described by the above embodiments includes: an associated number between the MT and the first AP and an MAC address of the first AP, and also can include valid time of MT and the first AP certification and association, the first AP information, MT certification information and valid time for the first AP caching the frame. In this case, the MT and the first AP certification and association information can be stored in a list or database.

When the MT relieves the association with the first AP, the method further comprises:

since the first AP is preconfigured with the valid time for the first AP caching the frame related to the MT, the association relief between the MT and the first AP triggers the timing of the valid time for the first AP caching the frame;

if there is a data frame to be sent to the MT within the valid time for caching the frame, the first AP caches all the data frames for the MT to be sent to the MT before receiving the MT and the second AP certification and association information.

In the technical solution described by the above embodiments, the method further comprises: the second AP looks up the locally stored mobile terminal certification and association information about the cell covered by the first AP service, if the associated number between the MT and the first AP and the MAC address of the first AP do not exist in the mobile terminal certification and association information about the cell covered by the first AP service, or if the associated number between the MT and the first AP and the MAC address of the first AP are inconsistent with the information in the mobile terminal certification and association information about the cell covered by the first AP service, or if the associated number between the MT and the first AP and the MAC address of the first AP exist in the mobile terminal certification and association information about the cell covered by the first AP service, however the MT and the first AP certification and association information already exceeds the valid time range of the MT and the first AP certification and association, then the handover process ends.

In the technical solution described by the above embodiments, the method further comprises: after the second AP has received the data frame sent from the MT, the second AP looks up a locally stored access control list, if the information about MT does not exist in the access control list, then it loops up a mobile terminal certification and association information list of the cell covered by the first AP service.

In the technical solution described by the above embodiments, cells which overlap with cells covered by the first AP service can be a plurality of cells, which includes a cell covered by the second AP service; likewise, cells which overlap with cells covered by the second AP service can also be a plurality of cells, which also includes a cell covered by the first AP service. After the MT has completed the handover, the method further comprises:

the second AP sends the MT and the second AP certification and association information to the APs of the cells which overlap with cells covered by the second AP service.

After the APs of the cells which overlap with cells covered by the second AP service and do not overlap with cells covered by the first AP service have received the MT and the second AP certification and association information, they look up the locally stored mobile terminal certification and association information respectively, determine that the MT and the second AP certification and association information is not previously stored, then store the MT and the second AP certification and association information.

After the APs of the cells which overlap with cells covered by the first AP service and the second AP service and the first AP have received the MT and the second AP certification and association information, they look up the locally stored mobile terminal certification and association information respectively, determine that the MT and the first AP certification and association information is previously stored, then delete the MT and the first AP certification and association information and store the MT and the second AP certification and association information.

In the technical solution described by the above embodiments, the method further comprises:

after the first AP has stored the MT and the second AP certification and association information, the first AP sends the MT and the first AP association relief information to the APs of the cells which overlap cells covered by with the first AP service except the second AP.

After the APs of the cells which overlap with cells covered by the first AP service and the second AP service have received the MT and the first AP association relief information sent from the first AP, they look up the locally stored mobile terminal certification and association information respectively, determine that the MT and the second AP certification and association information is previously stored, then discard the MT and the first AP association relief information.

After the APs of the cells which overlap with cells covered by the first AP service and the second AP service have received the MT and the first AP association relief information sent from the first AP, they look up the locally stored mobile terminal certification and association information, determine that the MT and the first AP certification and association information is previously stored, then delete the MT and the first AP association relief information.

In the technical solution described by the above embodiments, the method further comprises: the first AP sends the data frame cached by the MT to the second AP within the valid time for caching the frame in addition to storing the MT and the second AP certification and association information, then the second AP sends the data frame to the MT.

In the technical solution described by the above embodiments of the present invention, since each AP is stored with the mobile terminal certification and association information about a cell which overlaps with a cell covered by its service, when the MT needs to hand over from a cell covered by the first AP service to a cell covered by the second AP service, the second AP can rapidly determine whether or not to allow the MT to access according to the stored information, thus overcoming the problem that the wireless local cell network communication needs to be re-certificated during the handover, significantly improving the communication efficiency, and avoiding the influence on the quality of service by temporary service interruption caused by handover; and, since each AP is also stored with the shared key of an AP of a cell which overlaps with a cell covered by its service, the data transmitted between the MT and different APs have different keys or employ a key negotiated by the MT and the AP, which can ensure that the data transmitted between each MT and AP have different keys, apparently avoiding the problem that one ESS uses an identical key and effectively improving the communication security.

Figure 3:
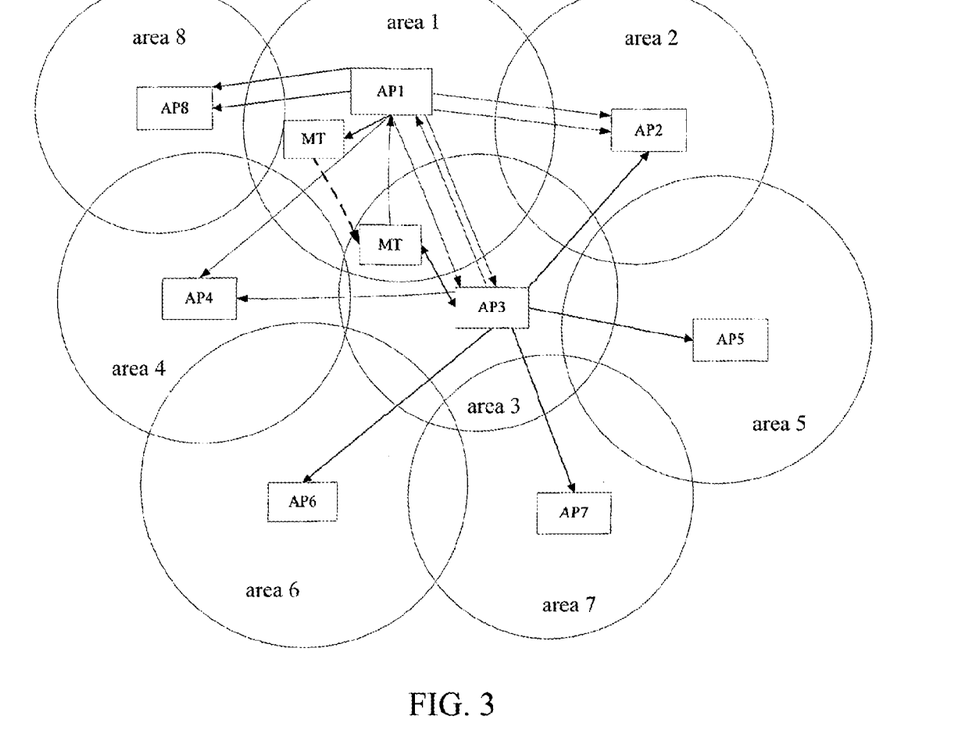
FIG. 3 is a schematic diagram of an MT handover scenario according to the embodiments of the present invention.

As shown in FIG. 3, FIG. 3 is a schematic diagram of an MT handover scenario according to the embodiments of the present invention. In the figure, there are eight APs (AP1-AP8), eight cells (area1-area8) and one MT. Hereinafter, the handover method for a mobile terminal according to another embodiment of the present invention will be described by taking cells covered by AP1, AP2, AP3, AP4, AP5, AP6, AP7, and AP8 services and the MT handing over from a cell covered by the AP1 service (area1) to a cell covered by the AP3 service (area3) as an example.

Each AP stores the mobile terminal certification and association information about a cell which overlaps with a cell covered by its service. In FIG. 3, taking area1 and area3 as an example, cells which overlap with area1 include: area2, area3, area4, and area8, and cells which overlap with area3 include: area1, area2, area4, area5, area6 and area7. Taking AP1 as an example, the MT is associated with AP1, AP1 sends the MT and AP1 certification and association information to AP2, AP3, AP4 and AP8; and AP2, AP3, AP4 and AP8 store the MT and AP1 certification and association information. Therefore, AP3 stores the mobile terminal certification and association information about area1, the information includes the MT and AP1 certification and association information. Likewise, if there is the mobile terminal certification and association information about area2, area4, area5, area6 or area7, AP3 will store the same. In general, the wireless terminal certification and association information can be stored in the list, and also the wireless terminal certification and association information can be stored in the database. The specified way for storage is not limited by the present invention. In the following, the technical solution of this embodiment will be described with a wireless terminal certification and association information list.

Figure 4:
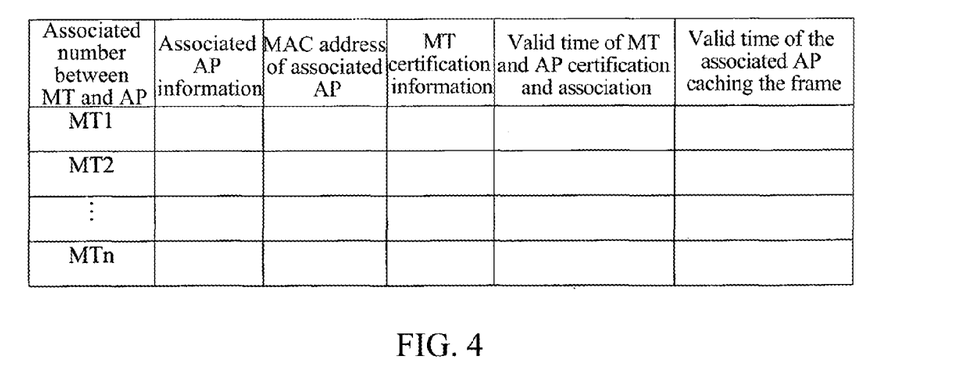
FIG. 4 is a schematic diagram of a wireless mobile terminal certification and association information list according to the embodiments of the present invention.

As shown in FIG. 4, FIG. 4 is a schematic diagram of a wireless mobile terminal certification and association information list according to the embodiments of the present invention. The information included by the list in the figure is: associated number between the MT and the AP, associated AP information, MAC address of the associated AP, MT certification information, valid time of MT and AP certification and association, valid time for the associated AP caching the frame, etc.

Figure 5:
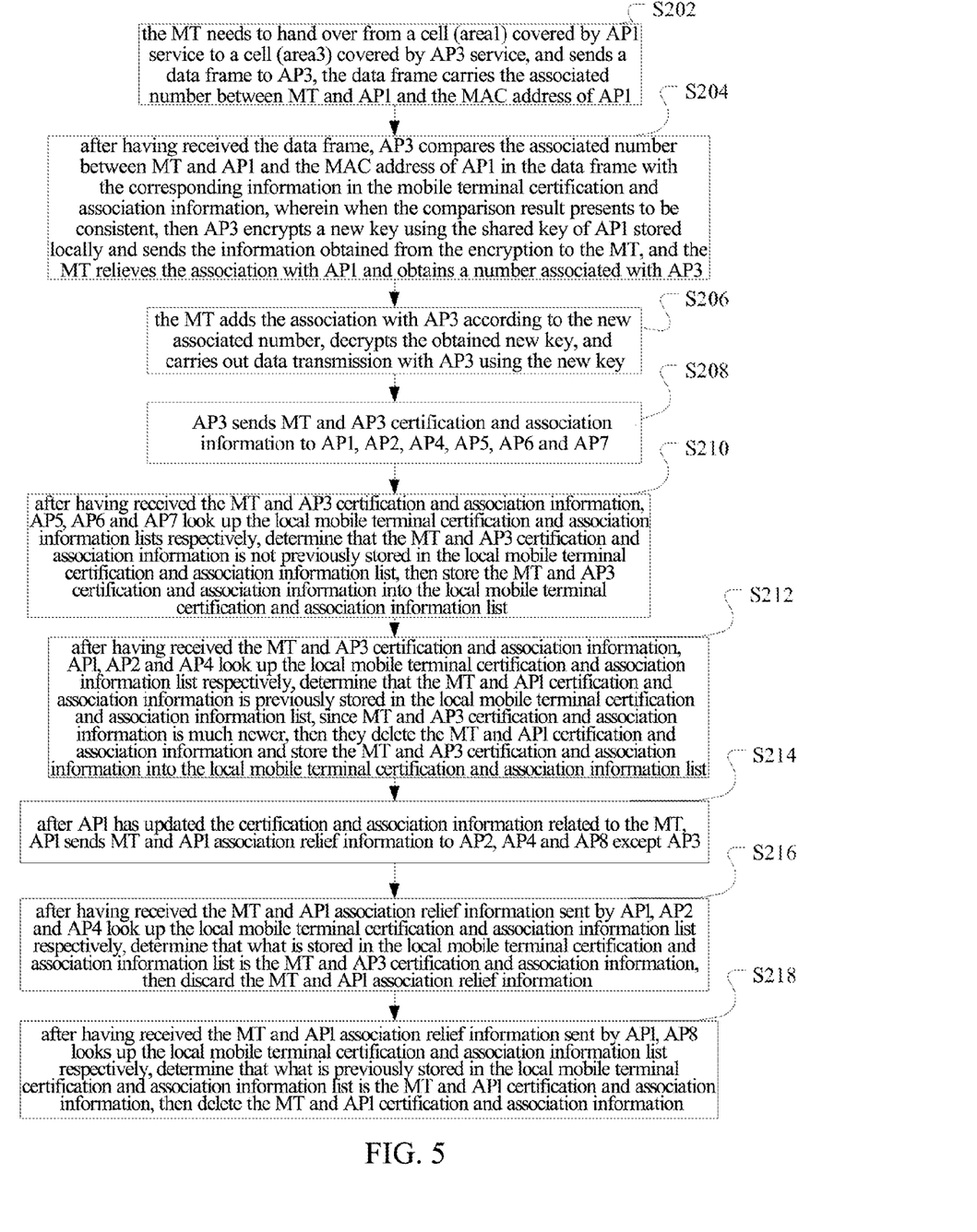
FIG. 5 is a flowchart of an MT handover method according to another embodiment of the present invention.

As shown in FIG. 5, FIG. 5 is a flowchart of an MT handover method according to another embodiment of the present invention, and the method includes:

S202: the MT needs to hand over from a cell (area1) covered by AP1 service to a cell (area3) covered by AP3 service, and sends a data frame to AP3, the data frame carries the associated number between MT and AP1 and the MAC address of AP1.

S204: after having received the data frame, AP3 compares the associated number between MT and AP1 and the MAC address of AP1 in the data frame with the corresponding information in the mobile terminal certification and association information, wherein when the comparison result presents to be consistent, then AP3 encrypts a new key using the shared key of AP1 stored locally and sends the information obtained from the encryption to the MT, and the MT relieves the association with AP1 and obtains a number associated with AP3.

In addition, when comparing the mobile terminal certification and association information, it further comprises: judging whether the MT and the AP1 certification and association information is within the valid time range of the MT and the AP1 certification and association, if yes, then AP3 sends the new key encrypted using the locally stored new key encrypted by the shared key of AP1 to the MT.

The method further comprises: AP1 is pre-configured with the valid time for caching the frame related to the MT, the association relief between MT and AP1 triggers the timing of the valid time for AP1 caching a frame. If there is a data frame to be sent to the MT within the valid time for caching the frame, the AP1 caches all the data frames for the MT to be sent to the MT before receiving the MT and AP3 certification and association information; and if the valid time for caching the frame is expired, even there is a data frame to be sent to the MT, AP1 will still discard this data frame.

The method further comprises: if the associated number between the MT and AP1 and the MAC address of AP1 do not exist in the mobile terminal certification and association information list, or if the associated number between the MT and AP1 and the MAC address of AP1 are inconsistent with the information in the mobile terminal certification and association information list, or if the associated number between the MT and AP1 and the MAC address of AP1 exist in the mobile terminal certification and association information list, however the MT and AP1 certification and association information already exceeds the valid time range of the MT and AP1 certification and association, then the handover process ends.

The method further comprises: after AP3 has received the data frame and before it looked up the local mobile terminal certification and association information list, AP3 looks up the local access control list; if the MT information does not exist in this local access control list, then S204 is performed.

The method further comprises: if the MT information exists in this local access control list, the AP3 can forward the data sent by the MT according to the information in this local access control list.

It needs to note that each AP stores the shared key of an AP of a cell which overlaps with a cell covered by its service. Taking AP1 and AP3 as an example, AP1 pre-stores the shared keys of AP2, AP3, AP4 and AP8, AP3 pre-stores the shared keys of AP1, AP2, AP4, AP5, AP6, and AP7, AP3 can directly encrypt the new key using the stored shared key of AP1. This new key can be the shared key of AP3 and can also be a key generated after the negotiation between MT and AP3.

S206: the MT adds the association with AP3 according to the new associated number, decrypts the obtained new key, and carries out data transmission with AP3 using the new key.

Thus, the MT completes the handover from area1 to area3.

Continuously in conjunction with FIG. 3, after the MT has completed the handover, the method further comprises:

Step 208: AP3 sends MT and AP3 certification and association information to AP1, AP2, AP4, AP5, AP6 and AP7.

Step S210: after having received the MT and AP3 certification and association information, AP5, AP6 and AP7 look up the local mobile terminal certification and association information lists respectively, determine that the MT and AP3 certification and association information is not previously stored in the local mobile terminal certification and association information list, then store the MT and AP3 certification and association information into the local mobile terminal certification and association information list.

Step S212: after having received the MT and AP3 certification and association information, AP1, AP2 and AP4 look up the local mobile terminal certification and association information list respectively, determine that the MT and AP1 certification and association information is previously stored in the local mobile terminal certification and association information list, since MT and AP3 certification and association information is much newer, then they delete the MT and AP1 certification and association information and store the MT and AP3 certification and association information into the local mobile terminal certification and association information list.

S214: after AP1 has updated the certification and association information related to the MT, AP1 sends MT and AP1 association relief information to AP2, AP4 and AP8 except AP3.

The method further comprises: AP1 sends the data frame cached by the MT to AP3 within the valid time for caching the frame in addition to storing the MT and AP3 certification and association information, then AP3 sends this data frame to the MT.

S216: after having received the MT and AP1 association relief information sent by AP1, AP2 and AP4 look up the local mobile terminal certification and association information list respectively, determine that what is stored in the local mobile terminal certification and association information list is the MT and AP3 certification and association information, then discard the MT and AP1 association relief information.

S218: after having received the MT and AP1 association relief information sent by AP1, AP8 looks up the local mobile terminal certification and association information list respectively, determine that what is previously stored in the local mobile terminal certification and association information list is the MT and AP1 certification and association information, then delete the MT and AP1 certification and association information.

The method further comprises: AP1, AP2, AP3, AP4, AP5, AP6, AP7, and AP8 scan the local mobile terminal certification and association information list regularly, delete the certification and association information related to MT which exceeds the valid time range of the certification and association.

The method further comprises: when the association time of MT and AP3 exceeds the valid time range of the MT and AP3 certification and association, AP3 sends MT and AP3 certification and association information to AP1, AP2, AP4, AP5, AP6, and AP7; and after having received the MT and AP3 certification and association information, AP1, AP2, AP4, AP5, AP6, and AP7 update the local mobile terminal certification and association information lists respectively.

In the technical solution described by the above embodiments of the present invention, since each AP stores the mobile terminal certification and association information of a cell which overlaps with a cell covered by its service, when the MT needs to hand over from area1 to area3, AP3 can rapidly determine whether or not to allow the MT to access according to the stored information, thus overcoming the problem that the wireless local area network communication needs to be re-certificated during the handover, significantly improving the communication efficiency, and avoiding the influence on the quality of service by temporary service interruption caused by the handover; and, since each AP also stores the shared key of an AP of a cell which overlaps with a cell covered by its service, the data transmitted between the MT and different APs have different keys or employ a key negotiated by the MT and the AP, which can ensure that the data transmitted between each MT and AP have different keys, apparently avoiding the problem that one ESS uses an identical key and effectively improving the communication security.

During a practical application, the above handover process can also be achieved by setting a system, for example:

providing a handover request unit and a user side handover execution unit in the MT, and providing a handover judgment unit and a network side handover execution unit in the second AP, wherein the handover request unit is used for sending a data frame for requesting a handover when an MT to which it belongs needs to handover from a first AP to a second AP, with the data frame including an associated number between MT and the first AP and the MAC address of the first AP;

the handover judgment unit is used for comparing the associated number between MT and the first AP and the MAC address of the first AP in the data frame from the handover request unit with the corresponding contents in the mobile terminal certification and association information stored by the second AP, when the comparison result presents to be consistent, then notifying the handover execution unit, encrypting a new key using the shared key of the first AP, and sending the information obtained from the encryption to the user side handover execution unit; and the user side handover execution unit is used for completing the handover with the network side handover execution unit by using the new key.

A timing judgment unit can also be provided in the second AP for judging whether the MT and the first AP certification and association information exists in the valid time range of the MT and the first AP certification and association, and notifying the handover judgment unit to encrypt the new key when the judgment result is yes.

Still, a first AP side handover information synchronization unit and a second AP side handover information synchronization unit can be provided in the first AP and the second AP respectively, wherein the first AP side handover information synchronization unit is used for sending MT and the first AP association relief information to the APs in the cells which overlap with the cells covered by the first AP service except the second AP; and the second AP side handover information synchronization unit is used for sending MT and the second AP certification and association information to the APs in the cells which overlap with the cells covered by the second AP service.

By way of the above description of the embodiments, those skilled in the art can clearly learn that the present invention can be implemented in the manner of software plus a necessary hardware platform, and of course, it can also be embodied totally by hardware, but the former is a preferred implementation in most cases. Based on such perception, part of or all of the contributions made by the technical solution of the present invention to the related art can be embodied in the form of software products, and this computer software product can be stored in a storage medium, such as ROM/RAM, magnetic disk, optical disk, etc., including several instructions to enable a computer device (it can be a personal computer, server, or network device, etc.) to execute the method described by various embodiments of the present invention or some portions of the embodiments.

Above description is only to illustrate the preferred embodiments but not to limit the present invention, and any amendments, equivalent substitutions, improvements etc. within the sprit and principle of the present invention are all concluded in the scope of protection of the present invention

I claim:

1. A handover method for a mobile terminal, comprising:

a second access point (AP) storing mobile terminal certification and association information about a cell which overlaps with a cell covered by the second AP service, wherein the mobile terminal certification and association information comprises an associated number between a mobile terminal (MT) and a first AP of the cell which overlaps with the cell covered by the second AP service, associated AP information, MT certification information, and a media access control (MAC) address of the first AP;

the mobile terminal (MT) sending a data frame to the second access point (AP) when the mobile terminal (MT) needs to hand over from a cell covered by a first wireless AP service to a cell covered by the second AP service, wherein the data frame contains the associated number between the MT and the first AP and the media access control (MAC) address of the first AP;

after having received the data frame, the second AP comparing the associated number between the MT and the first AP and the media access control (MAC) address of the first AP in the data frame with corresponding contents in the mobile terminal certification and association information stored by the second AP, when the comparison result presents to be consistent, the second AP encrypting a new key using a shared key of the first AP and sending information obtained from the encryption to the MT, and the MT relieving the association with the first AP and obtaining a number associated with the second AP;

the MT adding an association with the second AP according to the obtained number associated with the second AP, decrypting the obtained new key, and carrying out a data transmission with the second AP using the new key;

the second AP sending MT and the second AP certification and association information to APs of cells which overlaps with a cell covered by the second AP service;

after APs of cells which overlap with cells covered by the second AP service and do not overlap with cells covered by the first AP service have received the MT and the second AP certification and association information, said APs looking up the locally stored mobile terminal certification and association information respectively, determining that the MT and the second AP certification and association information is not previously stored, then storing the MT and the second AP certification and association information; and after APs of cells which overlap with cells covered by both the first AP service and the second AP service, and the first AP have received the MT and the second AP certification and association information, said APs and the first AP looking up the locally stored mobile terminal certification and association information respectively, determining that the MT and the first AP certification and association information is previously stored, then deleting the MT and the first AP certification and association information and storing the MT and the second AP certification and association information.

2. The method according to claim 1, when comparing with the mobile terminal certification and association information, further comprising:

judging whether the MT and the first AP certification and association information is within a valid time range of the MT and the first AP certification and association, if yes, then the second AP sending the new key encrypted by using the locally stored shared key of the first AP to the MT.

3. The method according to claim 2, further comprising:
the second AP scanning a local mobile terminal certification and association information list regularly and deleting all certification and association information related to the MT which exceeds the valid time range of certification and association.

4. The method according to claim 1, wherein the mobile terminal certification and association information contains the mobile terminal certification and association information about a cell covered by the first AP service.

5. The method according to claim 1, further comprising:
the second AP storing a shared key of an AP of a cell which overlaps with a cell covered by the second AP service, wherein the key contains the shared key of the first AP.

6. The method according to claim 1, wherein the new key is a shared key of the second AP; or the new key is a key generated after a negotiation between the MT and the second AP.

7. The method according to claim 1, further comprising:
after the first AP has stored the MT and the second AP certification and association information, the first AP sending MT and the first AP association relief information to an AP of a cell which overlaps with a cell covered the first AP service except the second AP;
after APs of cells which overlap with cells covered by the first AP service and the second AP service have received the MT and the first AP association relief information, said APs looking up the locally stored mobile terminal certification and association information respectively, determining that the MT and the second AP certification and association information is previously stored, then discarding the MT and the first AP association relief information; and
after APs of cells which overlap with cells covered by the first AP service and do not overlap with cells covered by the second AP service have received the MT and the first AP association relief information, said APs looking up the locally stored mobile terminal certification and association information, determining that the MT and the first AP certification and association information is previously stored, then deleting the MT and the first AP certification and association information.

8. The method according to claim 1, wherein the MT and the first AP certification and association information comprises: an associated number between the MT and the first AP and the MAC address of the first AP.

9. The method according to claim 8, wherein the MT and the first AP certification and association information further comprises: valid time of the MT and the first AP certification and association, the first AP information, the MT certification information and valid time for the first AP caching frames.

10. The method according to claim 9, further comprising:
the first AP being preconfigured with the valid time for the first AP caching frames related to the MT, the MT and the first AP association relief triggering timing of the valid time for the first AP caching frames; and if there is a data frame to be sent to the MT within the valid time for caching frames, the first AP caching all data frames for the MT to be sent to the MT before receiving the MT and the second AP certification and association information.

11. The method according to claim 1, further comprising: if the associated number between the MT and the first AP and the MAC address of the first AP do not exist in the mobile terminal certification and association information about the cell covered by the first AP service, or if the associated number between the MT and the first AP and the MAC address of the first AP are inconsistent with information in the mobile terminal certification and association information about the cell covered by the first AP service, or if the associated number between the MT and the first AP and the MAC address of the first AP exist in the mobile terminal certification and association information about the cell covered by the first AP service, however the MT and the first AP certification and association information already exceeds the valid time range of the MT and the first AP certification and association, ending the handover process.

12. The method according to claim 1, further comprising: after the second AP has received the data frame, the second AP looking up a locally stored access control list, if information about the MT does not exist in the access control list, then looking up a mobile terminal certification and association information list of the first cell.

13. A handover system for a mobile terminal, comprising: a handover request unit, a handover judgment unit, a user side handover execution unit, a network side handover execution unit, and a second AP side handover information synchronization unit, wherein
the handover request unit is used for sending a data frame for requesting a handover when the MT needs to hand over from a first AP to a second AP, wherein the data frame contains an associated number between the MT and the first AP and an MAC address of the first AP;
the handover judgment unit is used for comparing the associated number between the MT and the first AP and the MAC address of the first AP in the data frame from the handover request unit with corresponding contents in mobile terminal certification and association information stored by the second AP, when the comparison result presents to be consistent, then notifying the network side handover execution unit, encrypting a new key using a shared key of the first AP, and sending information obtained from the encryption to the user side handover execution unit, wherein the mobile terminal certification and association information refers to mobile terminal certification and association information about a cell which overlaps with a cell covered by the second AP service, and the mobile terminal certification and association information is pre-stored in the second AP and comprises an associated number between the MT and the first AP of the cell which overlaps with the cell covered by the second AP service, associated AP information, MT certification information, and a MAC address of the first AP; and
the user side handover execution unit is used for completing the handover with the network side handover execution unit by using the new key;
the second AP side handover information synchronization unit is used for sending MT and the second AP certification and association information to APs of cells which overlap with a cell covered by the second AP service, wherein,
after APs of cells which overlap with cells covered by the second AP service and do not overlap with cells covered by the first AP service have received the MT and the second AP certification and association information, said APs look up the locally stored mobile terminal certification and association information respectively, determine that the MT and the second AP certification and association information is not previously stored, then store the MT and the second AP certification and association information; and after APs of cells which overlap with cells covered by both the first AP service and the second AP service, and the first AP have received the MT and the second AP certification and association information, said APs and the first AP look up the locally stored mobile terminal certification and association information respectively, determine that the MT and the first AP certification and association information is previously stored, then delete the MT and the first AP certification and association information and store the MT and the second AP certification and association information.

14. The system according to claim 13, further comprising a timing judgment unit for judging whether the MT and the first AP certification and association information exists in a valid time range of the MT and the first AP certification and association, and notifying the handover judgment unit to encrypt the new key when the judgment result is yes.

15. The system according to claim 13, further comprising a first AP side handover information synchronization unit, wherein the first AP side handover information synchronization unit is used for sending MT and the first AP association relief information to an AP in a cell which overlaps with a cell covered by the first AP service except the second AP.

* * * * *